(12) United States Patent
Ryu et al.

(10) Patent No.: US 8,268,139 B2
(45) Date of Patent: Sep. 18, 2012

(54) HYDROGEN GENERATION APPARATUS

(75) Inventors: Hee Yeon Ryu, Gyeonggi-do (KR); Gyu Jin Jang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 995 days.

(21) Appl. No.: 12/286,013

(22) Filed: Sep. 26, 2008

(65) Prior Publication Data

US 2009/0272588 A1 Nov. 5, 2009

(30) Foreign Application Priority Data

Apr. 30, 2008 (KR) .................. 10-2008-0040243
Apr. 30, 2008 (KR) .................. 10-2008-0040244
Apr. 30, 2008 (KR) .................. 10-2008-0040245

(51) Int. Cl.
*C25B 9/06* (2006.01)

(52) U.S. Cl. .................. 204/269; 205/637; 429/499

(58) Field of Classification Search .................. 204/269; 205/637; 429/499
See application file for complete search history.

(56) References Cited

U.S. PATENT DOCUMENTS

| | | | |
|---|---|---|---|
| 7,790,013 B2 * | 9/2010 | McClaine et al. | 205/637 |
| 2001/0045364 A1 * | 11/2001 | Hockaday et al. | 205/338 |
| 2002/0083643 A1 * | 7/2002 | Amendola et al. | 48/61 |
| 2005/0178061 A1 * | 8/2005 | Tonca | 48/61 |
| 2006/0003203 A1 * | 1/2006 | Wang et al. | 429/21 |
| 2008/0026269 A1 * | 1/2008 | Shurtleff et al. | 429/19 |
| 2008/0145719 A1 * | 6/2008 | Yang et al. | 429/13 |
| 2009/0035624 A1 * | 2/2009 | Kobayashi | 429/19 |
| 2009/0042072 A1 * | 2/2009 | Vu et al. | 429/21 |
| 2010/0098622 A1 * | 4/2010 | Saxena | 423/657 |

FOREIGN PATENT DOCUMENTS

| | | |
|---|---|---|
| JP | 09-176879 | 7/1997 |
| JP | 09-176881 | 7/1997 |
| KR | 2003-0059030 | 7/2003 |
| KR | 100790680 | 12/2007 |

OTHER PUBLICATIONS

U.S. Appl. No. 60/951,609, filed Jul. 24, 2007.*

* cited by examiner

*Primary Examiner* — Nicholas A. Smith

(74) *Attorney, Agent, or Firm* — Edwards Wildman Palmer LLP; Peter F. Corless

(57) ABSTRACT

The present invention relates to a hydrogen generation apparatus using chemical hydride. The present invention features an electrolyte including chemical hydride and a catalyst that is inserted between metal electrodes, wherein the hydrogen is generated in a unit cell by hydrolysis of the hydride.

17 Claims, 7 Drawing Sheets

$MgH_2 + MgCl_2 +$ ELECTROLYTE (WITH $H_2O$)

HYDROGEN GENERATION APPARATUS

CROSS-REFERENCE TO RELATED APPLICATION

This application claims under 35 U.S.C. §119(a) the benefit of Korean Patent Application No. 10-2008-0040243 filed Apr. 30, 2008, 10-2008-0040244 filed Apr. 30, 2008 and 10-2008-0040245 filed Apr. 30, 2008 the entire contents of which are incorporated herein by reference.

BACKGROUND (a) Technical Field

The present invention relates to a hydrogen generation apparatus. More particularly, the present invention relates to a hydrogen generation apparatus, which can generate a hydrogen gas by hydrolysis of a chemical hydride to use it as a fuel supply source for a fuel cell system using a hydrogen gas as a fuel.

(b) Background Art

A fuel cell is a generator which converts chemical energy of a fuel into electric energy by an electrochemical reaction within a fuel cell stack. The fuel cell can be used to supply power to small-sized electric/electronic devices or portable devices as well as power for industrial and home uses and for vehicle operation.

A fuel cell under extensive research is a fuel cell using hydrogen as a fuel while using oxygen as an oxidant to be used as a power source for vehicle operation, for example, a polymer electrolyte membrane fuel cell or a proton exchange membrane fuel cell ("PEMFC").

Preferred examples of the hydrogen storage system available at present include high-pressure hydrogen, liquefied hydrogen, metal hydride, chemical hydride, carbon nanotube, etc. Of these, in particular, methods using the high-pressure hydrogen and the liquefied hydrogen have been most developed. However, in the case of a hydrogen storage system using high-pressure hydrogen, weight storage density of the hydrogen is very low, thus necessitating a very large volume to achieve a target driving distance, which results in a problem in vehicle package. Here, the amount of the hydrogen storage may be increased by increasing the pressure but it may reduce safety and increase cost.

In the example of a hydrogen storage system that uses a liquefied hydrogen, the hydrogen storage density is higher than the high-pressure hydrogen, but a relatively low temperature (25K, 1 atm) must be always maintained, and further there is a boil-off problem.

As an alternative, a new hydrogen storage system using a metal hydride ("MH") and a chemical hydride have been developed. [We would prefer not to characterize the background art].

A hydrogen storage system using a metal hydride is a system which can adjust temperature and pressure of the hydrogen storage metal to store and emit hydrogen. The hydrogen storage system using a metal hydride requires a temperature higher than 150° C. for a reversible reaction, so that inhale/exhale can be readily performed. However, hydrogen in the amount of less than that of the theoretical hydrogen storage is usually inhaled/exhaled within the reversible range of the hydrogen inhale/exhale, and the reaction is performed rather slowly.

The hydrogen storage system using a chemical hydride is a system which generates hydrogen through hydrolysis of a hydride containing hydrogen. In the system using a chemical hydride, the hydrogen storage amount becomes twice as much as that of the hydrogen storage capacity of a hydride because, in this system, an additional amount of hydrogen, which is equal to that of hydrogen contained in the hydride, is obtained by hydrolysis of water in addition to the hydrogen contained in the hydride itself. Moreover, when the hydrogen is generated by the reaction, the heat produced is not very high, and the pressure is almost at the level of atmospheric pressure and thus, the system can be managed rather safely. However, the chemical hydride is not easy to control for the reaction, and also the reaction is irreversible, thus requiring additional reproducing process.

Examples of conventional chemical hydrides include $NaBH_4$ and $LiBH_4$. These chemical hydrides are suitable for small scale hydrogen generation and are also considered safe. However, these materials are rather sensitive to humidity of air, unstable, and are considered as not easy to handle. Moreover, by-products produced during the reaction tend to deteriorate the progress of reactions of the remaining reactants.

Efforts have been made to introduce a catalyst in the system to accelerate the reaction. However, expensive precious metals such as Pt and Pt—Re/alumina have been excluded due to their high cost and thus most work has been performed using low-cost catalysts instead.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a hydrogen generation apparatus, which can adjust the amount of hydrogen generated during the hydrogen generation process by hydrolysis of a chemical hydride.

In a preferred embodiment, the hydrogen generation apparatus preferably uses a lower costcatalyst material in the hydride, instead of the conventional expensive metal catalyst, for cost effectiveness.

In another preferred embodiment, the hydrogen generation apparatus continuously supplies water for the hydrolysis in using the chemical hydride for the hydrogen generation.

In still another preferred embodiment, the hydrogen generation apparatus easily executes the regeneration process of suitably removing the by-product of the hydrolysis.

In yet another preferred embodiment, the hydrogen generation apparatus solves the problem of releasing hydrogen when the pressure of the generated hydrogen is increased, and provides the hydrogen to stack immediately after the fuel cell starts.

In another aspect, the present invention provides a hydrogen generation apparatus comprising a housing preferably including a hydrogen outlet, a cell module including deposited unit cells with electrolytes between electrodes, the electrolytes having a chemical hydride and a catalyst, a wiring electrically connecting the electrodes of the unit cells in parallel and a switch formed at the wiring to open and close a circuit between a positive electrode and a negative electrode of each unit cell. The hydrogen is suitably generated by hydrolysis of the chemical hydride with the electrolyte as a water source in each unit cell when the switch is closed, and the hydrogen generated is supplied through the hydrogen outlet.

In a preferred embodiment, the chemical hydride is preferably $MgH_2$, and the catalyst is preferably $MgCl_2$.

In another preferred embodiment, there may be provided a temporary storage space to store hydrogen generated in the hydrogen outlet within the housing of each unit cell.

In still another preferred embodiment, there may be suitably provided a hydrogen permeable membrane, disposed in one side of the cell module, which selectively permeates only a hydrogen gas to the hydrogen outlet of each unit cell.

In yet another preferred embodiment, the hydrogen generation apparatus may further comprise a water supply means which supplies water for hydrolysis into each unit cell charged with the electrolyte. Here, the water supply means suitably comprises a water storage space within the housing to supply water to each unit cell to which a water supply pipe is connected to supply water from an outside of the housing, and a water permeable membrane disposed in a water supply pipe to be disposed between the water storage space and the cell module.

In still yet another preferred embodiment, the water supply pipe may be provided so that it can suitably connect the water storage space with the fuel cell stack to supply the water from the fuel cell stack to the water storage space. A check valve may be installed in the water supply pipe to prevent a countercurrent flow of the water.

The housing of the hydrogen generation apparatus may comprise a body housing and a cap housing, preferably to be openable and to easily remove a by-product. The body housing and the cap housing may be formed in the form of a screw assembly.

The hydrogen generation apparatus may further comprise a hydrogen storage container, which is preferably connected to the hydrogen outlet of the housing, and suitably receives hydrogen generated in each unit cell from the hydrogen outlet and stores, and supplies the stored hydrogen through an additional outlet. A check valve may be suitably disposed in a pipe located between the housing and the hydrogen storage container.

According to the present invention, the hydrogen generation apparatus of the present invention applies the hydrolysis system of the chemical hydride to the chemical cell concept, and may control the hydrogen generation easily by opening/closing the circuit of the cell.

Preferably, the hydrogen generation apparatus of the present invention uses a relatively cheap catalyst material instead of the conventional expensive metal catalyst used in the chemical hydride, thereby reducing the cost.

Preferably, the hydrogen generation apparatus of the present invention produces an environment-friendly by-product which can be safely and easily used as a fuel source for a fuel cell vehicle.

Preferably, the hydrogen generation apparatus of the present invention may be suitably prepared in the form of a cartridge, and thus the vehicle may preferably be driven by simply replacing a used cartridge with a new one instead of the conventional high-pressure hydrogen charging. Thus, in preferred embodiments, the complex charging system of the hydrogen charging method is no more necessary. Further, the conventional hydrogen charging station is not needed with this preferred method, and the installation and the construction cost of the hydrogen charging station, which has been a limiting factor for the propagation of the fuel cell vehicles, may be solved.

Preferably, in the hydrogen generation apparatus of the present invention, a water supply means, which supplies water for the hydrolysis, additionally supplies the water exhausted from the fuel cell stack to each unit cell continuously. Thus, the efficiency for the hydrolysis may be increased, and the hydrogen generation may be suitably increased. In case the hydrogen generation apparatus of the present invention is suitably prepared in the form of a cartridge, the cartridge regeneration process for supplementing water and removing by-product is needed, but the replacement cycle of cartridges may be extended because the water is provided continuously from the stack by the water supply means during the fuel cell operation.

Preferably, when the housing of the hydrogen generation apparatus of the present invention is formed as a suitable openable structure, the by-product of the hydrolysis may be removed easily during the regeneration after use.

Preferably, the additional hydrogen storage container may suitably solve the problem that the hydrogen should be released to the outside when the pressure in the housing is suitably increased. The hydrogen of the hydrogen storage container may be provided to stack immediately after starting the fuel cell. Especially, the hydrogen generated at the unit cell is stored in the hydrogen storage container and is used immediately upon necessity. The hydrogen is stored in the hydrogen storage container if not needed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, wherein.

The present invention uses the hydrogen generation principle of the chemical cell, and the chemical hydride generating the hydrogen instead of the depolarizer is added into the electrolyte of the cell to increase the amount of hydrogen generated, and the hydrogen generation is adjusted by the opening/closing of the cell circuit.

Figure 1:
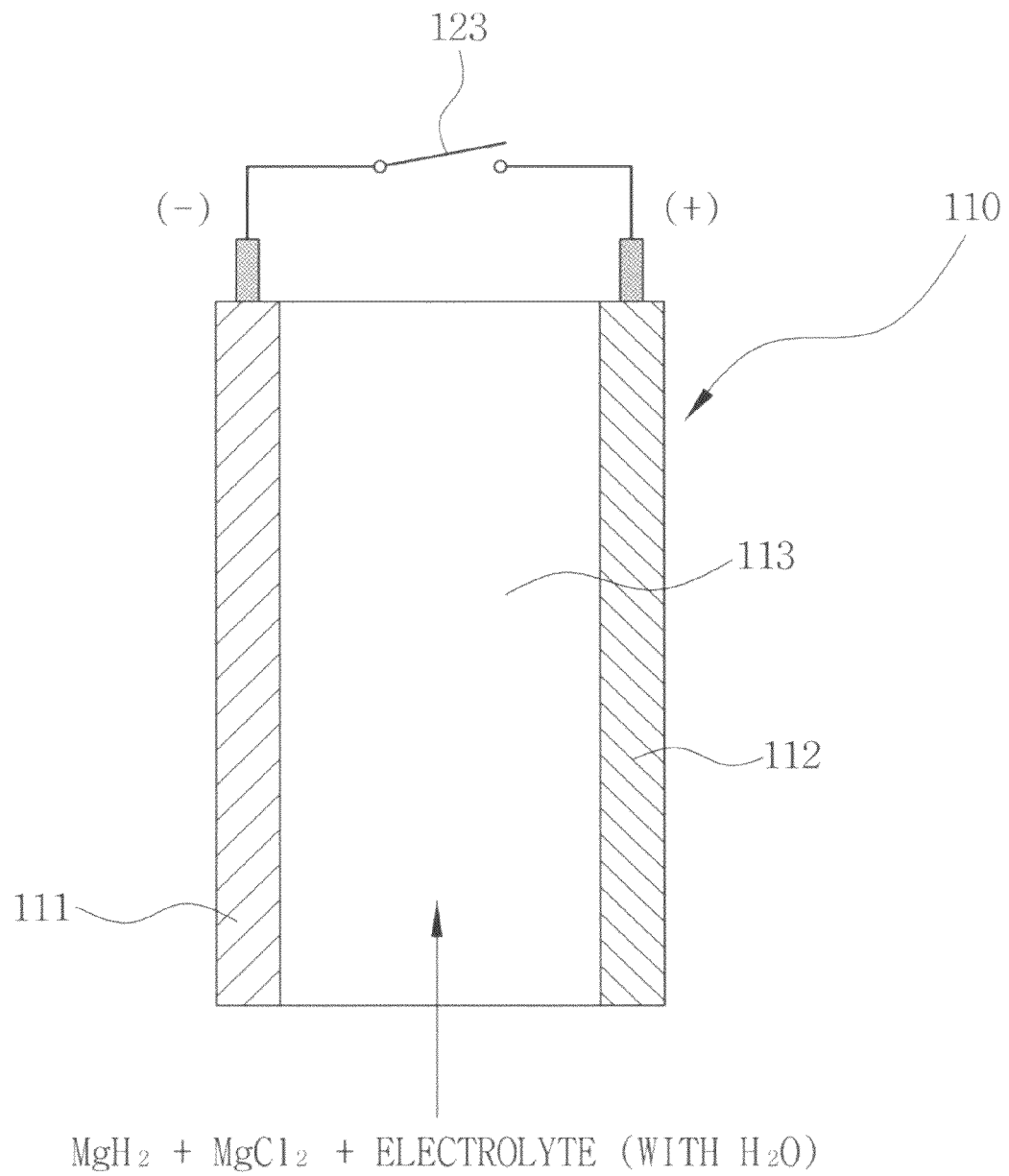
FIG. 1 is a cross-sectional view of a unit cell in accordance with an embodiment of the present invention.

Reference numerals set forth in the Drawings include reference to the following elements as further discussed below:

| 100: hydrogen generation apparatus | |
|---|---|
| 101: housing | 104: temporary storage space |
| 110: unit cell | 111: negative electrode |
| 112: positive electrode | 121: hydrogen permeable membrane |
| 131: water storage space | 132: water supply pipe |
| 133: check valve | 134: water permeable membrane |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a hydrogen generation apparatus comprising a housing including a hydrogen outlet, a cell module including deposited unit cells with electrolytes between electrodes, the electrolytes having chemical hydride and catalyst, a wiring electrically connecting the electrodes of the unit cells in parallel, and a switch formed at the wiring to open and close a circuit between a positive electrode and a negative electrode of each unit cell.

In one embodiment, hydrogen is generated by hydrolysis of the chemical hydride with the electrolyte as a water source in each unit cell when the switch is closed, and the generated hydrogen is supplied through the hydrogen outlet.

In other aspects, the invention also features motor vehicles comprising the hydrogen generation apparatus as described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is an exemplary cross-sectional view of a unit cell in accordance with an embodiment of the present invention.

Figure 2:
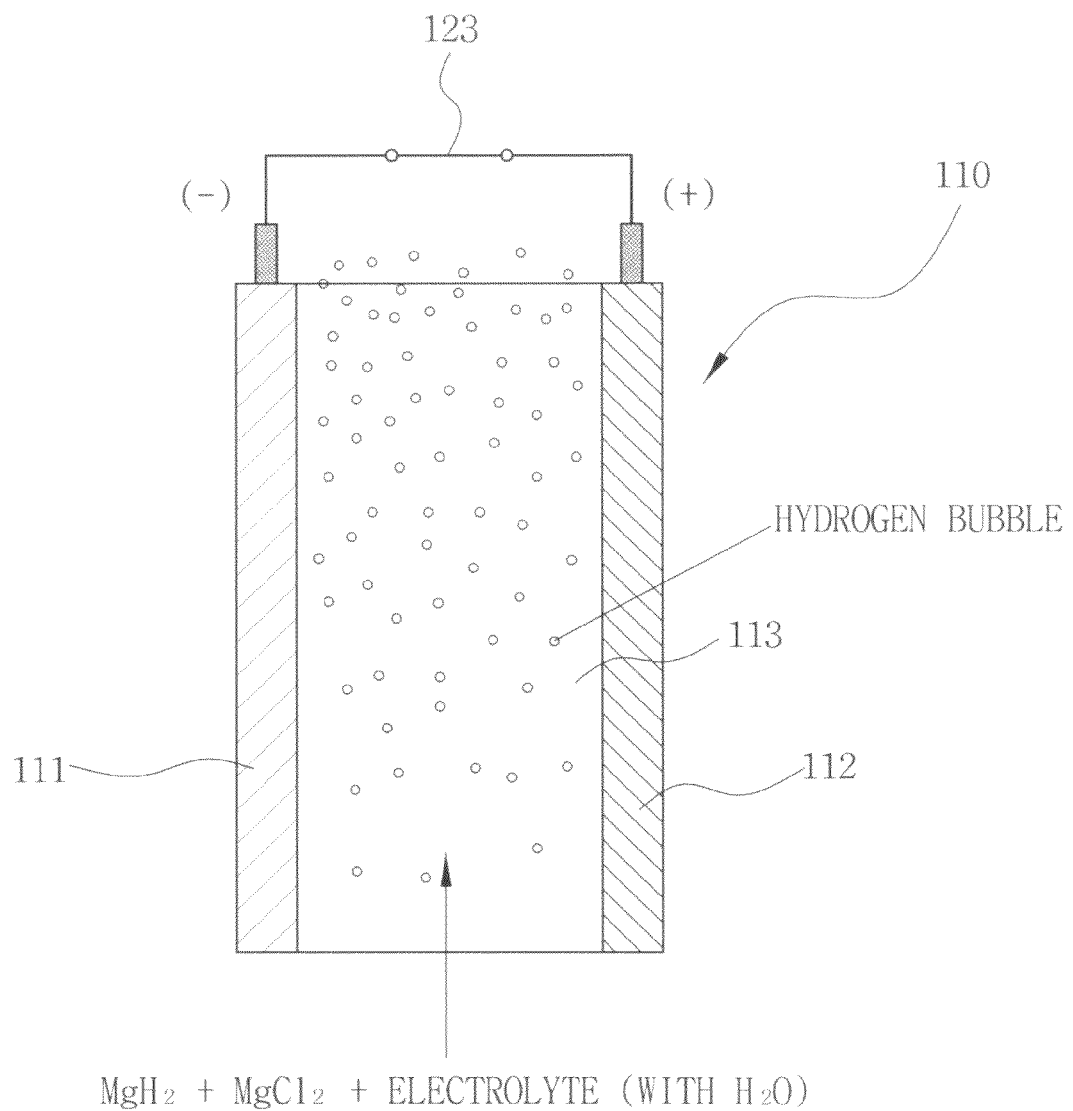
FIG. 2 is a cross-sectional view of a unit cell when hydrogen is generated in accordance with an embodiment of the present invention.

FIG. 2 is an exemplary cross-sectional view of a unit cell when hydrogen is generated in accordance with an embodiment of the present invention.

In one embodiment, a hydrogen generation apparatus of the present invention comprises a chemical cell structure which preferably uses a chemical hydride, a catalyst and an electrolyte as a water supplier of hydrolysis. The hydrogen generation apparatus suitably includes a plurality of unit cells 110, for example as illustrated in FIG. 1.

Preferably, the unit cell 100 includes chemical hydride, electrolyte and compound 113 of catalysts. In one embodiment, the chemical hydride is suitably disposed between two metal electrodes 111 and 112, which are preferably used as a positive electrode and a negative electrode, and suitably generates hydrogen by hydrolysis. The electrolyte is water as a preferred supplier for the hydrolysis. The compound 113 of the catalysis helps generation of hydrogen.

In preferred embodiments, the metal electrodes 111 and 112 of the unit cell 110 may preferably include selected adaptable metal in accordance with chemical hydride, catalyst, electrolyte, for example, but not limited to, Mg, Cu, Ni, Pb, Al, Li, as an electrode material used at a primary cell. For example, as will be described herein, when chemical hydride and catalyst including magnesium are preferably used, i.e., $MgH_2$ is used as a chemical hydride and $MgCl_2$ is used as a catalyst, magnesium electrode may be preferably used as the negative electrode 111 and copper electrode may be preferably used the positive electrode 112. [$Mg(s) \rightarrow Mg^{2+} + 2e^-$, $E_0 = 2.37V / Cu^{2+} + 2e^- = Cu(s)$, $E_0 = 0.34V$]

Preferably, the chemical hydride for generating hydrogen of the unit cell 110 of the present invention may be at least one selected from the group consisting of, but not limited to, $MgH_2$, $NaBH_4$, $LiBH_4$, $NaClH_4$, $CaH_2$ and $LiH$, and the catalyst may be at least one selected from the group consisting of, but not limited to, $MgCl_2$, $NaCl$, $KCl$, $LiCl$ and $CaCl_2$.

In one embodiment of the invention, the material capable of generating hydrogen by hydrolysis as a chemical hydride in the hydrogen generation apparatus of the present invention may be selected and used taking into consideration, for example, the reproducibility of a by-product and an environmental aspect, for example, $MgH_2$ is preferable in this regard. $MgH_2$ generates an environment-friendly by-product by hydrolysis of $Mg(OH)_2$, so that the hydrogen generation apparatus is suitably environmentally more preferable when $MgH_2$ is used.

Preferably, when $MgH_2$ is suitably used as the chemical hydride, $MgCl_2$ may be used as the catalyst. Preferably, instead of using an expensive precious metal catalyst, a less costly salt such as, but not limited only to, $MgCl_2$ may be used, so that the hydrogen generation apparatus may be manufactured at a low cost.

In the conventional chemical hydride hydrolysis, the hydrogen bubbles are attached to the surface of the hydride, thereby deteriorating the electromotive force. In the hydrolysis system of the present invention, MgCl2 is suitably used as a catalyst, and helps the hydrogen bubbles formed on the surface of the reactant to be detached. $MgCl_2$ suitably prevents polarization occurring on the surface of $MgH_2$, and serves as an electrolyte.

In further embodiments, the electrolyte in the unit cell of the hydrogen generation apparatus is used to supply water for hydrolysis, and may be preferably used in a common electrolyte comprising water, which is usually used to a common primary chemical cell, and may be suitably used with pure water.

In other further embodiments, the unit cell structure of the present invention, in which the electrolyte including chemical hydride is suitably inserted into a space between two electrodes, is substantially the same as a conventional unit cell structure, in which electrolytes are added between two electrodes of a conventional primary cell.

preferably, a circuit opening/closing switch 124 is installed at a wiring connected to the negative electrode 111 and the positive electrode 112 of the unit cell 110, and the hydrogen generation is suitably controlled by controlling the opening/closing of the switch. Preferably, when the hydrogen is not needed, as illustrated in FIG. 1, the cell circuit is suitably maintained as an open circuit by using the switch 124. In other embodiments, when the hydrogen is needed, as illustrated in FIG. 2, the cell circuit is suitably closed to allow current to flow.

In certain embodiments, when the cell circuit is closed by the switch, the hydrogen is suitably generated from the hydride, and the catalyst makes the hydrogen bubbles formed on the surface of the reactant detached, thereby preventing the decrease in electromotive force. Preferably, once the current is allowed to flow, the heat suitably generated from hydrolysis may be reduced to some extent.

Referring to FIG. 1, as a preferable embodiment of the unit cell, the magnesium electrode is preferably used as the negative electrode 111, and the copper electrode is preferably used as the positive electrode 112. $MgH_2$, a chemical hydride, and $MgCl_2$, saturated aqueous solution for catalytic reaction, are suitably mixed with the electrolyte of the primary cell comprising water, and the mixture is preferably injected into a space between the two electrodes. In further embodiments, the electrolyte, which is a water supplier for hydrolysis, may be an electrolyte solution for a common primary cell, or may be pure water.

In exemplary embodiments, the following equation represents the equation for hydrogen generation in the unit cell. $MgH_2$, a hydride, reacts with water to generate hydrogen, and $Mg(OH)_2$ is generated as a by-product therefrom in an irreversible reaction by hydrolysis of $MgH_2$.

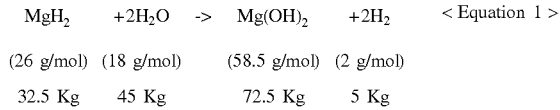

$$MgH_2 + 2H_2O \rightarrow Mg(OH)_2 + 2H_2 \quad <\text{Equation 1}>$$

(26 g/mol) (18 g/mol)   (58.5 g/mol) (2 g/mol)

32.5 Kg   45 Kg         72.5 Kg      5 Kg

To be used as a fuel supply source of a real fuel cell system, the hydrogen generation apparatus of the present invention preferably employs a plurality of unit cells, in which a mixture of chemical hydride, a catalyst and electrolytes are added into the space between the electrodes. Each unit cell generates hydrogen when the circuit connected with the positive electrode and the negative electrode is suitably closed, and sufficient amount of hydrogen for a fuel cell stack is provided.

Figure 3:
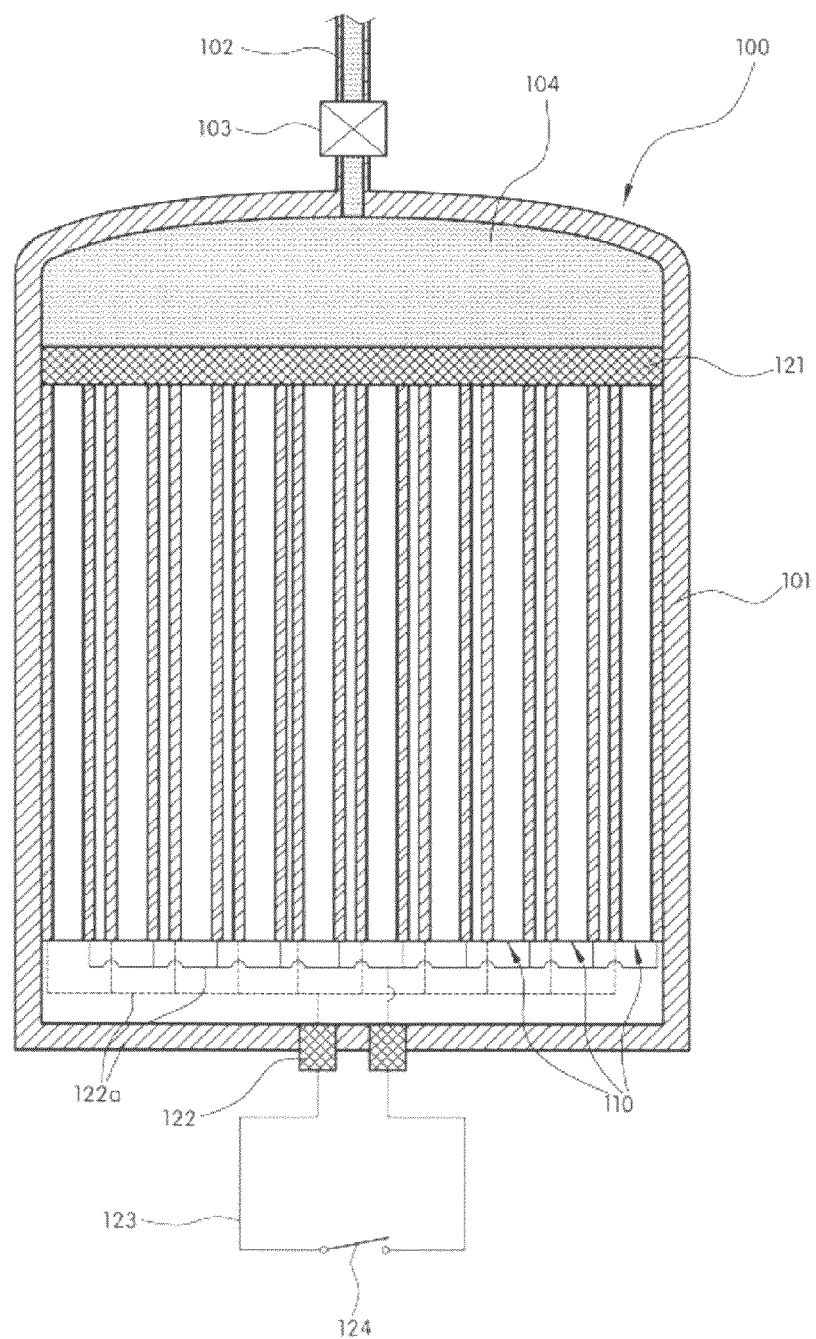
FIG. 3 is a cross-sectional view of a hydrogen generation apparatus in accordance with an embodiment of the present invention.

FIG. 3 is an exemplary cross-sectional view of a hydrogen generation apparatus in accordance with an embodiment of the present invention. As illustrated in FIG. 3, a cell module, in which a plurality of unit cells is suitably deposited in a housing, is received, and a circuit is formed to electrically connect the unit cells in parallel.

In further preferred embodiments, the cell module, in which the unit cells 110 are deposited as many as the proper number, is suitably received in the housing 101. Preferably, individual wirings connected to the negative and positive electrodes of the unit cells 110 are connected to a common wiring 122a in parallel by each polarity. Preferably, the common wiring 122a is electrically connected to an electrode 112 of the housing by each polarity, and a switch 124 is suitably installed at a wiring 123 electrically connected to the electrode 122a of the housing to connect selectively the positive electrode and the negative electrode of the unit cells. In certain preferred embodiments, when the switch 124 is open, circuits between electrodes of the unit cells 110 become opened.

Preferably, the switch 124 is a means for adjusting hydrogen generation of the unit cells 110, and hydrolysis and hydrogen generation of the unit cell is suitably stopped when the switch is opened, and current flows through the circuit between the positive and negative electrodes and hydrogen generates from each unit cell when the switch is suitably closed.

Preferably, a hydrogen outlet 102, through which hydrogen may be exhausted, is suitably formed at one side of the housing 110, and an opening/closing valve, which may control hydrogen supply, i.e., a hydrogen supply valve 103 is suitably disposed in the hydrogen outlet 102.

In further embodiments, a temporary storage space 104, at which hydrogen generated at the unit cell 110 is stored temporarily, is formed at the hydrogen outlet 102 in the housing 101. Preferably, a hydrogen outlet stage of each unit cell 110 is suitably formed as an open structure to exhaust hydrogen generated at an electrolyte, and a hydrogen permeable membrane 121, which may permeate hydrogen selectively, is fixed and formed at the hydrogen outlet stage of the unit cells 110 at one side of the cell module.

The hydrogen generated in each unit cell 110 suitably penetrates the hydrogen permeable membrane 121 and moves to the temporary storage space 104. preferably, it is provided through the hydrogen outlet 102. The hydrogen permeable membrane may preferably include a hydrogen (gas) permeable membrane containing a polymer, and blocks hydride slurry or electrolyte having water, and allows only hydrogen to permeate.

In an embodiment of FIG. 3, the temporary storage space 104 is preferably formed on the cell module in the housing 10 to supply the hydrogen generated at the unit cells 110 through the hydrogen outlet 102 immediately according to necessity. The hydrogen outlet 102 is formed on the housing 101 to supply the hydrogen stored at the temporary storage space 104.

In order to use the hydrogen generation apparatus 100 of the present invention as a fuel supply source of a fuel cell system, the hydrogen generation may be suitably controlled by manipulating the drive of the switch 124 to opening/closing selectively the circuit between the positive and negative electrodes. The circuit may be formed to manipulate the drive of the switch by the control device of the fuel cell system.

In certain embodiments, when the fuel cell system is shutdown, the switch is preferably opened by a signal of the control device of the fuel cell system to stop the hydrogen generation. In further embodiments, when the fuel cell system is started up, the switch is closed to start the hydrogen generation.

In the hydrogen generation apparatus 100 of the present invention, the hydrogen generation may be controlled easily by a method for opening/closing of the circuit. Preferably, a current is generated during the hydrogen generation, and the increased temperature by the heat of the hydrolysis may be decreased to some extent.

Preferably, for supplying hydrogen, a hydrogen supply tube (not shown), which supplies hydrogen to the fuel cell stack, may be suitably connected to the hydrogen outlet 102. A pressure regulator (not shown), which adjusts the pressure of the hydrogen as the pressure required at the fuel cell stack may be suitably formed at the hydrogen supply tube.

In other embodiments, the hydrogen generation apparatus of the present invention preferably includes a chemical cell structure such as a primary cell. Thus, a pump and a by-product tank, which are needed to a conventional chemical hydride apparatus, preferably are not needed to the hydrogen generation apparatus of the present invention. Preferably, in the hydrogen generation apparatus of the present invention, the hydrolysis of the chemical hydride included in the electrolyte is used, and is different from the hydrogen generation system using electrolyte without chemical hydride.

In other embodiments, in the hydrogen generation system, in which power is applied to an electrode as a primary cell structure using an electrolyte in order to generate hydrogen without chemical hydride and catalyst, external electrical energy must be provided for electrolysis. Preferably, in the hydrogen generation apparatus of the present invention, the chemical hydride and the catalyst are added into the electrolyte, and the hydrogen is preferably generated through the hydrolysis of the chemical hydride, and the hydrogen generation is controlled by only the opening/closing of the circuit without any external power supply.

In certain embodiments, the hydrogen generation apparatus of the present invention receiving the cell module in the housing may be suitably provided as a cartridge shape as a conventional primary cell. The hydrogen generation apparatus is provided as the replaceable cartridge shape in the fuel cell vehicle, and the new cartridge is suitably replaced when water is exhausted to some extent after the irreversible reaction.

In the conventional high-pressure hydrogen tank, the weight storage density of the hydrogen is very low as about 3 wt %. However, the weight storage density of $MgH_2$ is high as about 15.3 wt %, and the actual generation amount is almost close to the theoretical value. Theoretically, when $MgH_2$ is hydrolyzed, about 1.8 liters of the hydrogen is generated per about 1 gram of $MgH_2$, and about 32.5 Kg of $MgH_2$ and about 45 Kg of water are needed with reference to the driving distance 500 Km for one charge of the fuel cell vehicle (referring to equation 1). Preferably, each unit cell includes about 500 g of $MgH_2$, and sixty-five of the unit cells are connected in parallel to form the cell module. In certain embodiments, the hydrogen generation apparatus is prepared in the form of a cartridge by using the cell module including about 32.5 Kg of $MgH_2$, and is mounted to the vehicle, so that theoretical and actual hydrogen generation amount is about 5 Kg and the driving distance of 500 Km may be satisfied enough. The water stored in each unit cell helps reaction in hydrolysis and lowers the exothermic temperature as the water is much enough. However, the weight and volume may be suitably minimized for mounting to the vehicle, preferably so that the optimized amount is calculated and used.

Preferably, when the hydrogen generation apparatus is prepared in the form of a cartridge, the complex charging system for charging high-pressure hydrogen to the hydrogen tank as the conventional type is not needed. Especially, when the hydrogen generation apparatus as the cartridge shape is provided to the conventional gas station, the cartridge always easily replaces to the vehicle without additional hydrogen charging station. In further embodiments, the hydrogen charging station is not needed, and the construction and the construction cost of the hydrogen charging station, which may be a limiting factor for supplying the fuel cell vehicle, may be solved.

The hydrolysis of the chemical hydride for hydrogen generation is an irreversible reaction which consumes water and produces by-products. According to preferred embodiments, the used cartridge is collected, and may be reusable after regeneration. In preferred embodiments, when $MgH_2$ is used as the chemical hydride, and Mg(OH)2 is generated as a by-product of the reaction, so that the regeneration process is preceded safely and easily.

In further embodiments, the hydrogen generation apparatus of the present invention may include a water supply means. The water supply means can preferably supply water which is required for hydrolysis of each unit cell. The water supply means maintains to supply water continuously to each unit cell, so that hydrolysis efficiency is suitably increased and the hydrogen generation amount is suitably increased.

Figure 4:
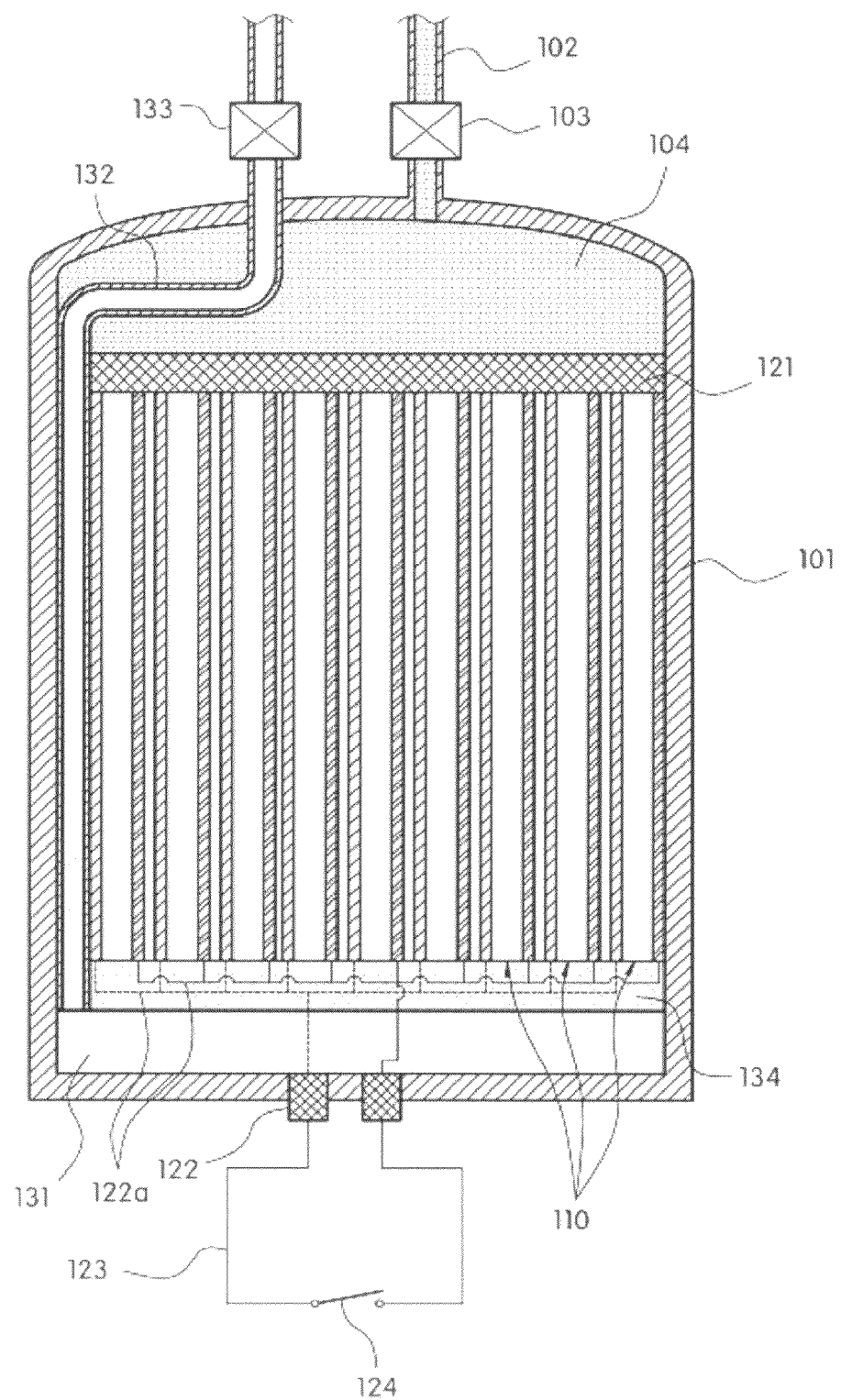
FIG. 4 is a cross-sectional view of a hydrogen generation apparatus having a water supply mean in accordance with an embodiment of the present invention.

FIG. 4 is an exemplary cross-sectional view of a hydrogen generation apparatus having a water supply mean in accordance with an embodiment of the present invention.

As illustrated in FIG. 4, a water supply space 131, in which water supplying to the unit cell of the cell module is temporarily stored, is preferably provided in the housing 101 to supply water to each unit cell 110. A water supply pipe 132 is suitably connected to the water storage space 131 to supply external water thereto. In preferred embodiments, the water storage space 131 in the housing 101 may be provided to a side, at which the water supply stage of the unit cells 110 of the cell module is preferably disposed. In order to supply water through the water supply stage, which is disposed in opposite to the hydrogen outlet of the unit cell 110, the water storage space 131 is preferably disposed in opposite to the temporary storage space 104 storing hydrogen.

In other embodiments, as illustrated, the water supply pipe 132 is preferably inserted from the side of the hydrogen outlet 102 into the housing to be connected to the water storage space 131, and a check valve 133 is suitably installed to prevent from a countercurrent of water at the water supply pipe 132 out of the housing 101. The check valve 133 prevents water from the countercurrent flow of the water provided from the stack, and provides water when the pressure in the housing (the water storage space) is low enough.

In a further preferred embodiment, the water exhausted from the fuel cell stack, for example, the water generated at a cathode of the stack by the reaction of the fuel cell, is preferably provided through the water supply pipe 132 to the water storage space 131 of the housing 101. The water supply pipe 132 is connected between the water storage space 131 and the stack of the housing 101, and supplies the water of the stack to the water storage space.

Preferably, a water permeable membrane 134 is installed as a filter shape between the water storage space 131 and the cell module to permeate water, and the water is always provided to unit cells 110 of the cell module. The water permeable membrane 134 is an open structure to provide water to the water supply stage of the each unit cell 110, and the water permeable membrane 134 is fixed and installed to the water supply stage of each unit cell 110 in opposite to the hydrogen permeable membrane 121 in the cell module. The water permeable membrane 134 is attached to the water supply stage of the unit cells 110 to conceal an inside of the cell filled with the electrolyte, and is fixed and installed in the housing 101.

The water exhausted from the stack when driving the fuel cell is inputted into the water storage space 131 of the housing 101 through the water supply pipe 132. The water inputted into the water storage space 131 passes through the water permeable membrane 134, and is filled up an inside of the cell charged with the electrolyte.

In a further embodiment of the invention, as exemplified in FIG. 4, the water storage space 131 is suitably provided under the cell module consisting of the unit cells 110 in the housing 101, and the water supply pipe 132 is inserted inside the housing from the side of the hydrogen outlet 102 on the housing 101 and is connected to the water storage space 131 under the cell module. The water permeable membrane 134 is preferably installed under the cell module, and the hydrogen permeable membrane 121 is preferably installed on the cell module.

Preferably, in each unit cell of the hydrogen generation apparatus of the present invention, the electrolyte is charged to store water, and the electrolyte including the water works a water supplying source and evokes the hydrolysis of the hydride. However, the hydrolysis generating the hydrogen is an irreversible reaction consuming the water in the unit cell continuously, and the water in the unit cell is decreased continuously during hydrogen generation, and the temperature if increased by emitting heat of the hydrolysis, so that water is evaporated or efficiency for hydrogen generation control is deteriorated. When water in each unit cell is decreased, the efficiency of the hydrolysis is deteriorated, and the hydrogen generation amount is decreased, and temperature may be increased by the decrease of water, which is a cooling element.

In embodiments of the present invention, the water supply means is preferably provided to provide water continuously to each unit cell, thereby, suitably maintaining the hydrolysis stably and additionally cooling by supplementing water. In further embodiments, especially, for stable hydrolysis and hydrogen generation, more water is needed than theoretically required water amount. Preferably, when water is supplied in a sufficient amount, the hydrogen generation amount close to the theoretical value may be suitably obtained.

Figure 5:
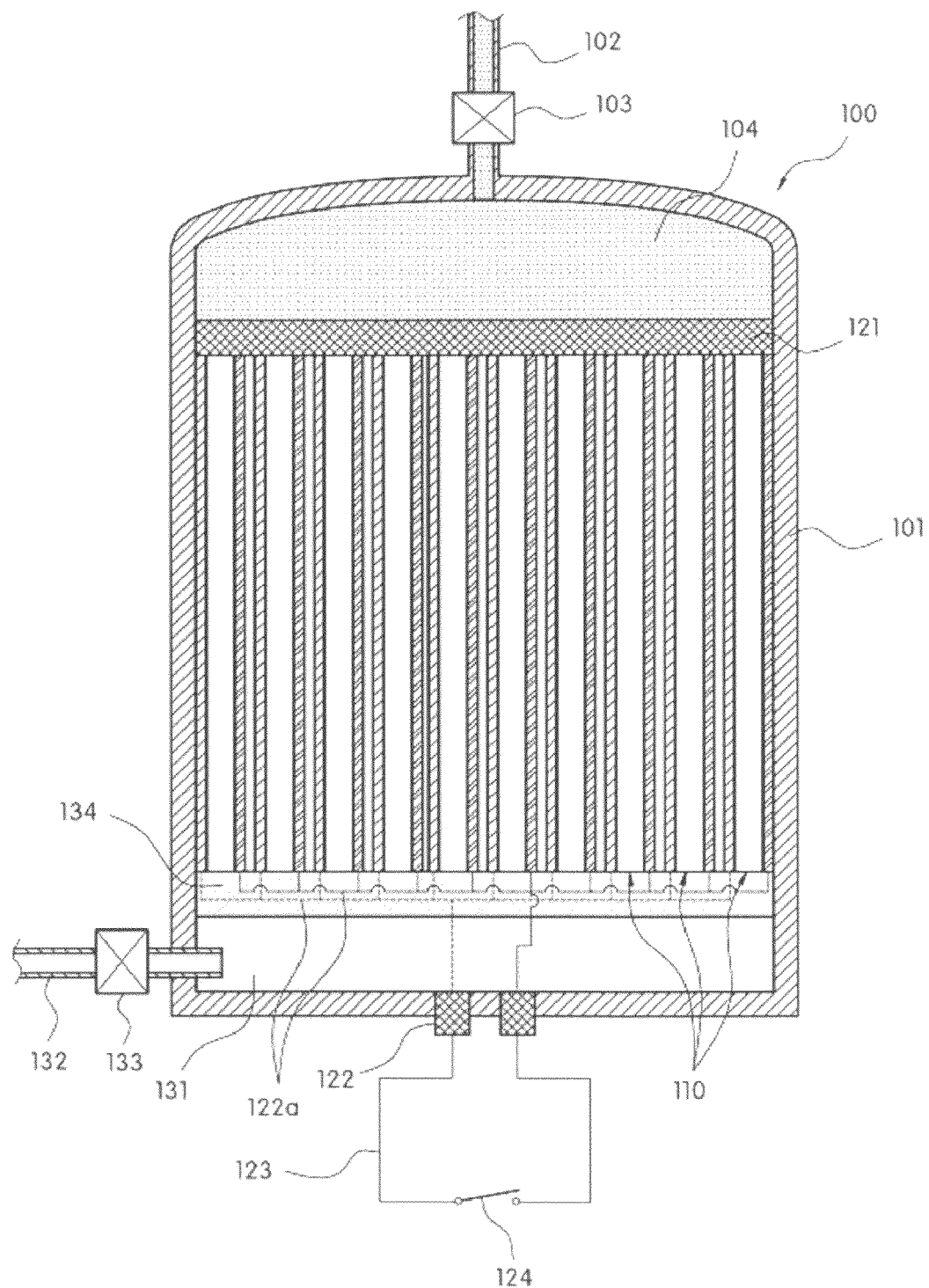
FIG. 5 is a cross-sectional view of a hydrogen generation apparatus having a water supply mean in accordance with another embodiment of the present invention.

FIG. 5 is an exemplary cross-sectional view of a hydrogen generation apparatus having a water supply mean in accordance with another embodiment of the present invention. In the present embodiment, the water supply pipe 132 is preferably installed to connect directly to the water storage space 131 out of the housing 101 instead of the water supply pipe passing inside the housing. As illustrated in FIG. 5, in a preferred embodiments, the water supply pipe 132 is not passing through the inside of the housing, and is connected directly to the water storage space 131 under the housing to supply water, and the check valve 133 is installed in the water supply pipe 132.

In the hydrogen generation apparatus of the present invention, the water of the stack is preferably supplied to the unit cell by the water supply means as described the above. In further embodiments, an additional water tank is provided and the water supply pipe is installed between the water tank and the hydrogen generation apparatus, and the water stored in the water tank instead of the stack may be suitably supplied to the unit cell through the water supply pipe and the water storage space.

In other further embodiments, in the hydrogen generation apparatus of the present invention, the housing including the unit cells may be preferably formed as an openable structure in order to remove by-products easily, and, preferably, an additional hydrogen storage container which stores the hydrogen generated at the unit cells may be provided.

Figure 6:
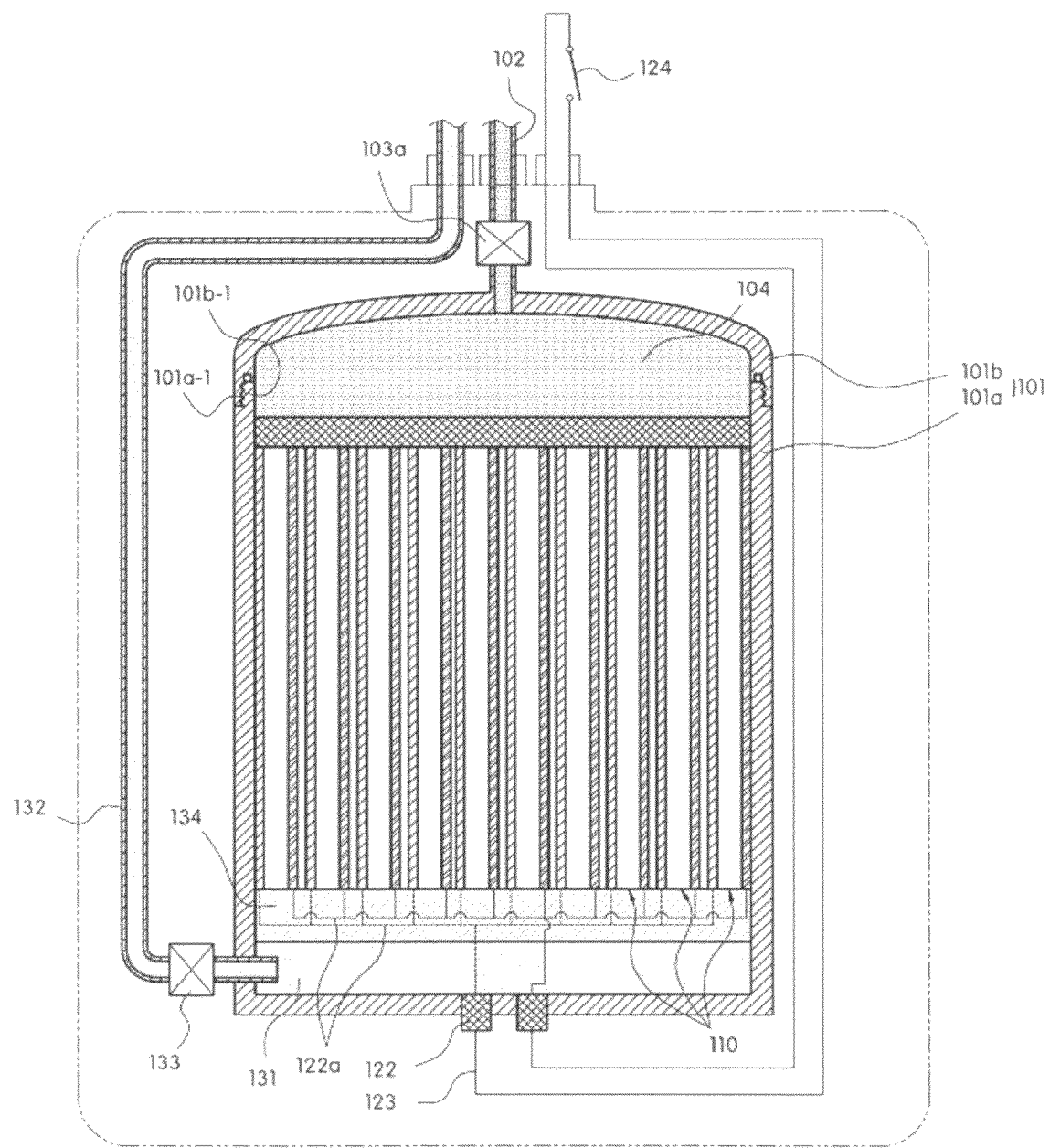
FIG. 6 is a cross-sectional view of a hydrogen generation apparatus having an openable housing in accordance with an embodiment of the present invention.

FIG. 6 is an exemplary cross-sectional view of a hydrogen generation apparatus having an openable housing in accordance with an embodiment of the present invention.

In preferred embodiments, the water supply pipe 132 is installed to connect directly to the water storage space 131 out of the housing 101 as illustrated in FIG. 6. The check valve 133 is preferably installed in the water supply pipe 132 out of the housing 101 to suitably prevent a countercurrent flow of the water.

In an embodiment of FIG. 6, the water storage space 131 is suitably provided under the cell module consisting of the unit cells 110 in the housing 101, and the water supply pipe 132 is connected to the water storage space 131 under the housing 101, and the water permeable membrane 134 is installed under the cell module, and the hydrogen permeable membrane 121 is installed on the cell module.

Preferably, the housing 101 may be formed as an openable structure to remove by-products easily. In certain embodiments, the housing 101 may comprise a body housing 101a and a cap housing 101b. Preferably, the body housing 101a includes a cell module having deposited unit cells 110 and a hydrogen permeable membrane 121, and the cap housing 101b preferably forms a temporary storage space 104. In further embodiments, the body housing 101a and the cap housing 101b are assembled by a combination mean to be formed integrally.

In another preferred embodiment, a screw combination means is provided to a mutual combination part of the body housing 101a and the cap housing 101b as the combination means. For example, in preferred embodiments, screw lines 101a-1 and 101b-1 are formed respectively at an upper column outside surface, which is combination part of the body housing 101a, and a lower column inside surface, which is combination part of the cap housing 101b. The upper column outside surface of the body housing 101a and the lower column inside surface of the cap housing 101b are suitably assembled by the screw lines 101a-1 and 101b-1. Preferably, the combination part of body housing 101a and the combination part of the cap housing 101b are suitably assembled by the screw structure. In preferred embodiments, when the regeneration process of the hydrogen generation apparatus occurs after uses, the body housing 101a and the cap housing 101b are separated, and the by-products of the hydrolysis, which is an irreversible reaction, may be removed easily.

Figure 7:
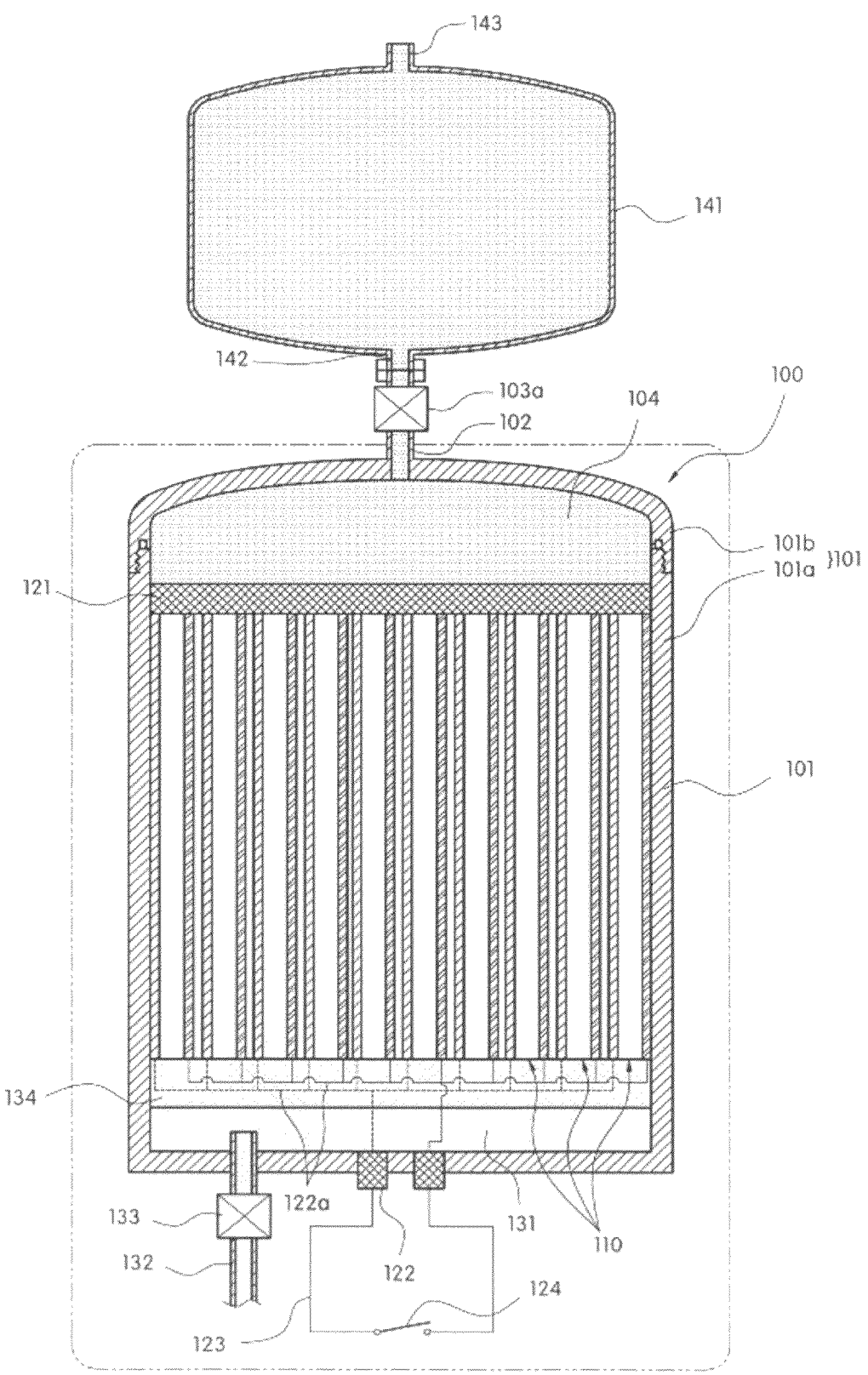
FIG. 7 is a cross-sectional view of a hydrogen generation apparatus having an additional hydrogen storage container in accordance with an embodiment of the present invention.

FIG. 7 is an exemplary cross-sectional view of a hydrogen generation apparatus having an additional hydrogen storage container in accordance with an embodiment of the present invention.

In an embodiment of the FIG. 7, the hydrogen storage container storing the hydrogen is preferably provided out of the housing of the hydrogen generation apparatus. The hydrogen storage container 141 is a high-pressure container preferably having an entrance 142 and an exit 143. The entrance 142 receiving hydrogen is suitably connected to the hydrogen outlet 102 provided at the housing 101 of the hydrogen generation apparatus. Preferably, a check valve 103a is installed at a tube connecting the entrance 142 of the hydrogen storage container 141 to the hydrogen outlet 102 of the housing 101 to suitably prevent the hydrogen supplied to the hydrogen storage container from countercurrent to the inside of the housing of the hydrogen generation apparatus.

Preferably, the hydrogen generated at the unit cells 110 of the hydrogen generation apparatus passes through the hydrogen permeable membrane 121 in the housing 101 and is collected at the temporary storage space 104, and is moved from the temporary storage space to an additional hydrogen storage container 141 when the hydrogen is charged to a pressure higher than a predetermined pressure.

In other embodiments, the hydrogen is charged and stored at high-pressure in the hydrogen storage container 141, and the check valve 103a suitably prevents the countercurrent flow of the charged hydrogen at the high-pressure from the hydrogen storage container to the housing of the hydrogen generation apparatus. In further embodiments, in the fuel cell stack, hydrogen of the hydrogen storage container is reacted primarily during the hydrogen generation in the unit cells in driving the fuel cell, and when the pressure of the hydrogen storage container is suitably decreased as the hydrogen is consumed, the hydrogen storage container 141 receives hydrogen from the temporary storage space 104 of the hydrogen generation apparatus.

Preferably, in connecting the hydrogen storage container 141 to the housing 101, a pipe and a fitting component are used for making the hydrogen storage container and the housing suitably separable from each other. Preferably, when the hydrogen storage container 141 is attached to the vehicle, the housing is separated, and the remaining hydrogen generation apparatus 100 except the hydrogen storage container may be replaceable easily. As described herein, when the hydrogen generation apparatus 100 is manufactured, for example as a cartridge shape, the remaining hydrogen generation apparatus 100 except for the hydrogen storage container 141 may be replaced easily.

In further embodiments of the invention, in order to supply the high-pressure hydrogen charged in the hydrogen storage container 141 as a fuel of the fuel cell stack, the hydrogen supply tube (not shown), which is connected to the fuel cell stack, is preferably connected to the exit 143 of the hydrogen storage container. Preferably, a pressure regulator (not shown), which adjusts the pressure of the hydrogen as the pressure required at the fuel cell stack, may be installed in the hydrogen supply tube.

In other further embodiments, an additional high-pressure hydrogen storage container 141 is connected to the housing 101 of the hydrogen generation apparatus 100, and the hydrogen generated at the unit cells 110 is more than the amount needed at the stack, so that the hydrogen of the temporary storage space 104 may be suitably prevented from leaking to outside by the increased pressure.

Preferably, the hydrogen generation is adjusted by the opening/closing of the electrical circuit connected to the electrodes of the unit cells in the hydrogen generation apparatus of the present invention, and the hydrolysis, by which the actual hydrogen generates, is chemical reaction. The chemical reaction kinetics is slower than the speed of the opening/closing driving of the electrical circuit. For example, when the electrical circuit is connected (closed) for starting the vehicle, a sufficient amount of the hydrogen is immediately supplied to the stack by the hydrolysis of the hydride. When the electrical circuit is open, the hydrogen generation by the hydrolysis is not stopped immediately but rather slowly, and the hydrogen generation is continued temporarily.

Preferably, the generated hydrogen may be stored at the temporary storage space 104, but, in certain cases, the capacity of the temporary storage space is not large enough, and the pressure may be suitably increased. Accordingly, in certain embodiments, the additional hydrogen storage container is not provided, and the hydrogen gas may be emitted to the outside when the pressure of the temporary storage space is increased excessively.

In certain embodiments, the additional hydrogen storage container 141 is provided as in the embodiment of the exemplary FIG. 7, and preferably the hydrogen may be moved into the hydrogen storage container automatically when the pressure of the temporary storage space 104 is increased to a level higher than the predetermined pressure. In further related embodiments, the remaining hydrogen of the temporary storage space generated after the operation of the fuel cell is stopped may be suitably stored in the hydrogen storage container. Accordingly, yhe hydrogen of the hydrogen storage container may be supplied to the stack immediately after the vehicle is started. Preferably, the entire hydrogen gas emitted when the pressure of the temporary storage space is increased excessively may be reused, so that the efficiency of the hydrogen usage is increased.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen generation apparatus comprising:
   a housing including a hydrogen outlet;
   a cell module including deposited unit cells with a mixture of electrolytes, chemical hydride and catalyst between electrodes;
   a wiring electrically connecting the electrodes of the unit cells in parallel; and
   a switch formed at the wiring to open and close a circuit between a positive electrode and a negative electrode of each unit cell,
   wherein hydrogen is generated by hydrolysis of the chemical hydride with the electrolyte as a water source in each unit cell when the switch is closed, and
   the generated hydrogen is supplied through the hydrogen outlet.

2. The hydrogen generation apparatus of claim 1, wherein the chemical hydride is at least one selected from the group consisting of $MgH_2$, $NaBH_4$, $LiBH_4$, $NaAlH_4$, $CaH_2$ and $LiH$.

3. The hydrogen generation apparatus of claim 1, wherein the catalyst is at least one selected from the group consisting of $MgCl_2$, $NaCl$, $KCl$, $LiCl$ and $CaCl_2$.

4. The hydrogen generation apparatus of claim 1, wherein the chemical hydride is $MgH_2$, and the catalyst is $MgCl_2$.

5. The hydrogen generation apparatus of claim 1, further comprising a temporary storage space in the hydrogen outlet in the housing, the temporary storage space capable of storing the hydrogen generated in each unit cell.

6. The hydrogen generation apparatus of claim 1, further comprising a hydrogen permeable membrane which is disposed in one side of the cell module and selectively permeates only hydrogen to the hydrogen outlet of each unit cell.

7. The hydrogen generation apparatus of claim 1, further comprising means for supplying water for hydrolysis into each unit cell charged with the electrolyte.

8. The hydrogen generation apparatus of claim 1, further comprising a water supply device comprising:
   a water storage space, which stores water to be supplied to each unit cell in the housing,
   a water supply pipe is connected to the water storage space for supplying water from an outside of the housing, and
   a water permeable membrane is disposed in a water supply stage to be disposed between the water storage space and the cell module.

9. The hydrogen generation apparatus of claim 8, wherein the water supply pipe connects the water storage space with the fuel cell stack to supply the water from the fuel cell stack to the water storage space.

10. The hydrogen generation apparatus of claim 8, wherein a check valve is installed in the water supply pipe to prevent a countercurrent flow of the water.

11. The hydrogen generation apparatus of claim 1, wherein the housing comprises a body housing and a cap housing to be openable and to remove a by-product easily.

12. The hydrogen generation apparatus of claim 11, wherein the body housing and the cap housing are formed as screw combination.

13. The hydrogen generation apparatus of claim 1, further comprising a hydrogen storage container, which is connected to the hydrogen outlet of the housing, and receives hydrogen generated in each unit cell from the hydrogen outlet and stores, and supplies the stored hydrogen through an additional outlet.

14. The hydrogen generation apparatus of claim 13, wherein a check valve is disposed in a pipe between the housing and the hydrogen storage container.

15. A hydrogen generation apparatus comprising:
- a housing including a hydrogen outlet;
- a cell module including deposited unit cells with a mixture of electrolytes, chemical hydride and catalyst between electrodes;
- a wiring electrically connecting the electrodes of the unit cells in parallel; and
- a switch formed at the wiring to open and close a circuit between a positive electrode and a negative electrode of each unit cell.

16. The hydrogen generation apparatus of claim 15, wherein hydrogen is generated by hydrolysis of the chemical hydride with the electrolyte as a water source in each unit cell when the switch is closed, and the generated hydrogen is supplied through the hydrogen outlet.

17. A motor vehicle comprising the hydrogen generation apparatus of claim 1 or claim 15.

* * * * *